United States Patent [19]

Efros

[11] 4,300,784
[45] *Nov. 17, 1981

[54] EFFICIENT, VERSATILE OSCILLATING PEDAL CYCLE

[75] Inventor: Boris Efros, Los Angeles, Calif.

[73] Assignee: Energenic Propulsions, Ltd., Los Angeles, Calif.

[*] Notice: The portion of the term of this patent subsequent to Jun. 9, 1998, has been disclaimed.

[21] Appl. No.: 36,150

[22] Filed: May 4, 1979

Related U.S. Application Data

[63] Continuation-in-part of Ser. No. 879,220, Feb. 21, 1978.

[51] Int. Cl.³ .............................................. B62M 1/04
[52] U.S. Cl. .................... 280/255; 280/236; 280/251
[58] Field of Search ............... 280/251, 255, 236, 243; 74/594.4, 594.5, 594.6

[56] References Cited

U.S. PATENT DOCUMENTS

| | | | |
|---|---|---|---|
| 391,212 | 10/1888 | Torkelson | 74/594.5 |
| 527,349 | 10/1894 | Scognamillo et al. | 74/594.6 |
| 556,545 | 3/1896 | Ljungstrom | 280/251 |
| 1,237,969 | 8/1917 | Stocks | 280/251 |
| 2,185,698 | 1/1940 | Wright | 280/251 |
| 2,449,266 | 9/1948 | Woods | 280/251 |
| 3,759,543 | 9/1973 | Clark | 280/255 |

FOREIGN PATENT DOCUMENTS

| | | | |
|---|---|---|---|
| 24298 | 12/1895 | United Kingdom | 280/251 |
| 23164 | 10/1897 | United Kingdom | 280/251 |
| 200385 | 11/1922 | United Kingdom | 280/251 |

Primary Examiner—John J. Love
Assistant Examiner—Donn McGiehan
Attorney, Agent, or Firm—Poms, Smith, Lande & Rose

[57] ABSTRACT

An oscillating pedal type bicycle is provided with a pedal lever having a front pedal supporting portion and a rear power transmitting portion which are rigidly connected together and which make an oblique angle with respect to one another, with the apex of the oblique angle pointing downwardly and to the rear in the intermediate position of the pedal levers. The two pedal levers each have an intermediate pivot point which is generally under the seat of the bicycle, with the rear end of the pedal lever near the driving hub of the bike and the front end of the pedal lever supporting pedals and being located close to the position of the pedals in a conventional bike during the power stroke. The front portion of the pedal lever between the pivot point and the pedal may be bent to increase the length of the stroke. The power ratio of the bike may be varied by varying the position of the driving chain, belt or other flexible member connected to the bicycle hub, along the length of the rearwardly extending portion of each of the pedal levers. A chain positioning slider on each of the rearwardly extending portions of each pedal lever may be unlocked and moved along the length of the pedal lever by remote control operated from the handle bars or front portion of the frame of the bicycle. Each pedal lever is coupled to the driving hub of the bicycle by separate clutches for independent pedal operation.

32 Claims, 36 Drawing Figures

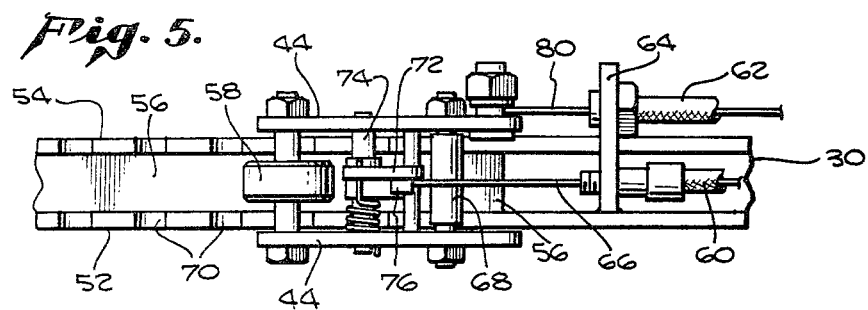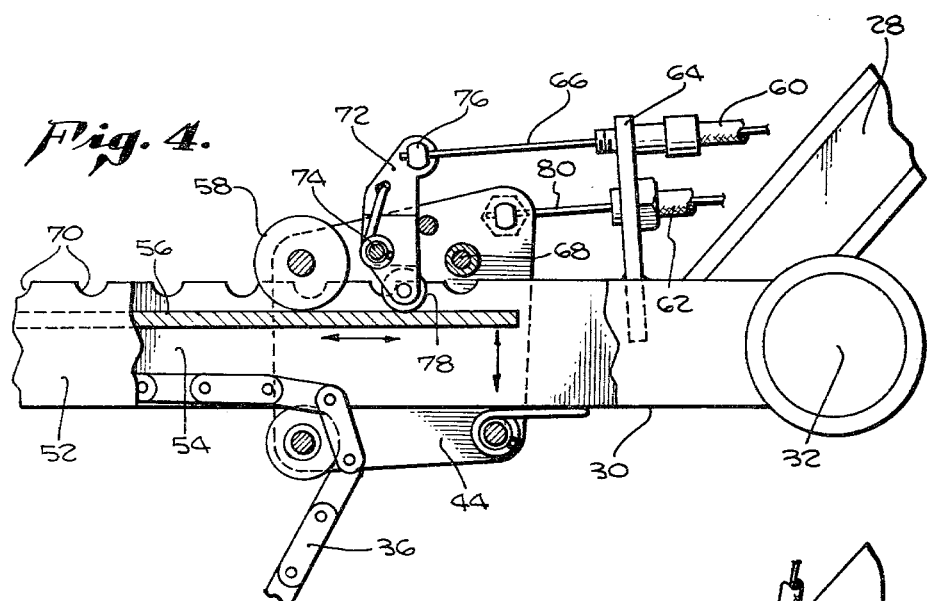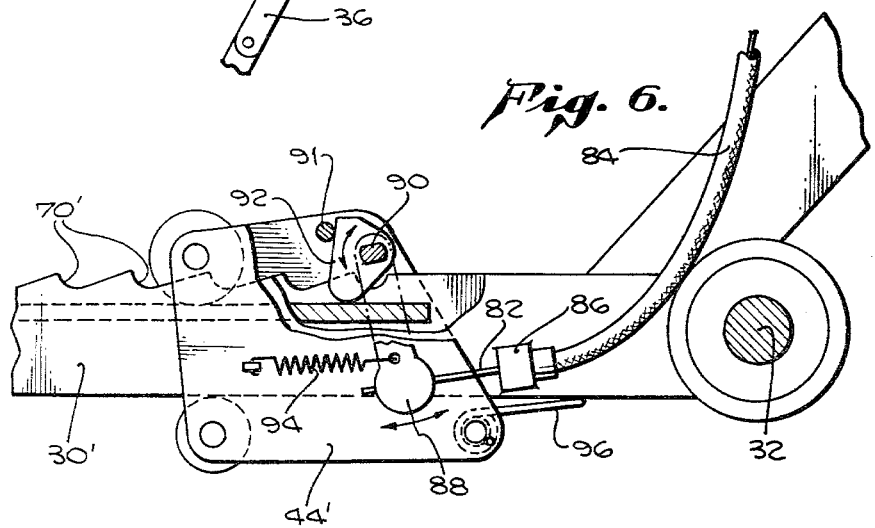

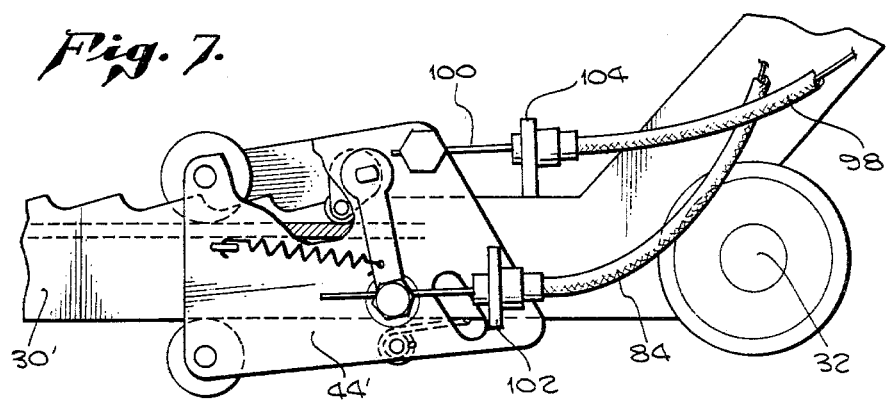
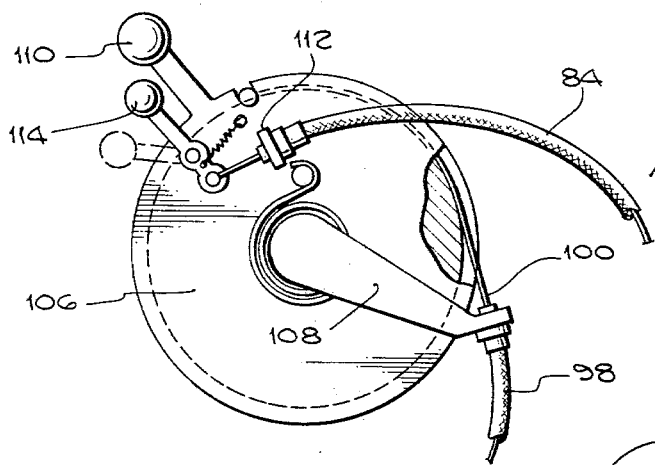
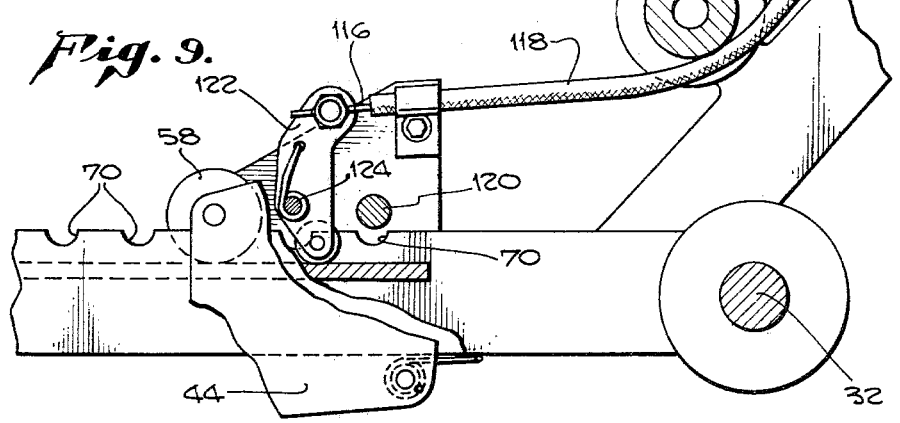

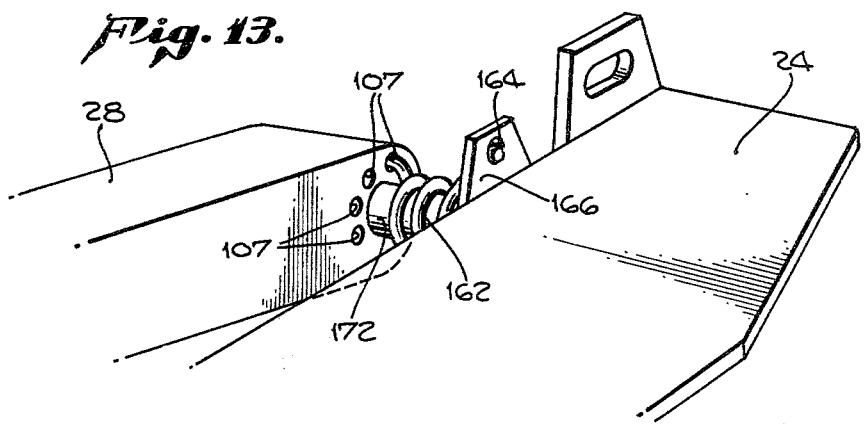
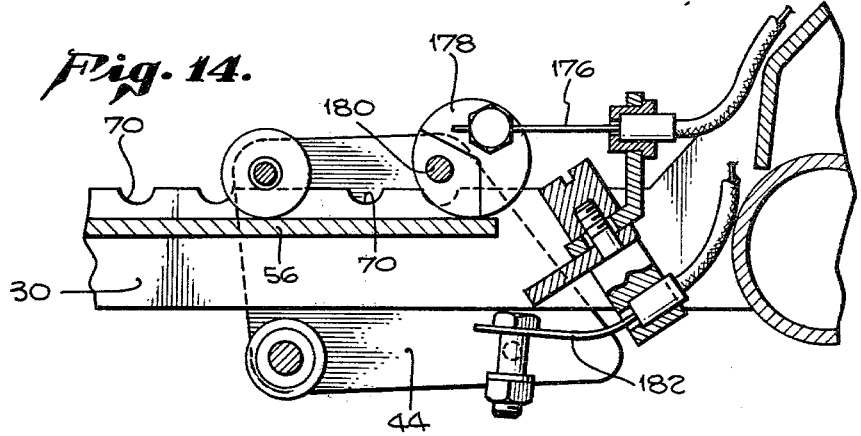
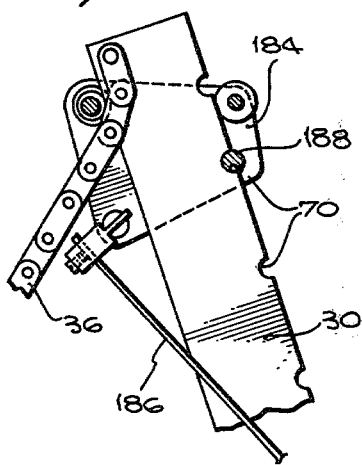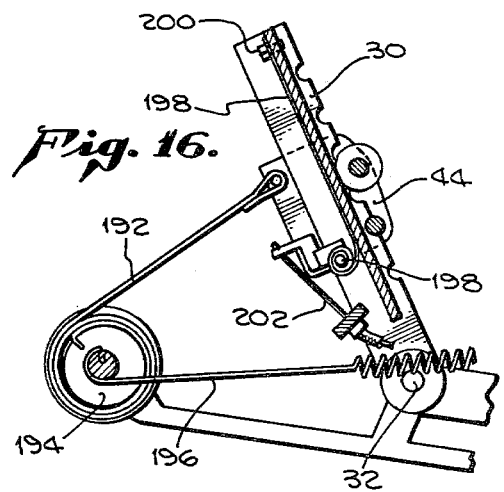

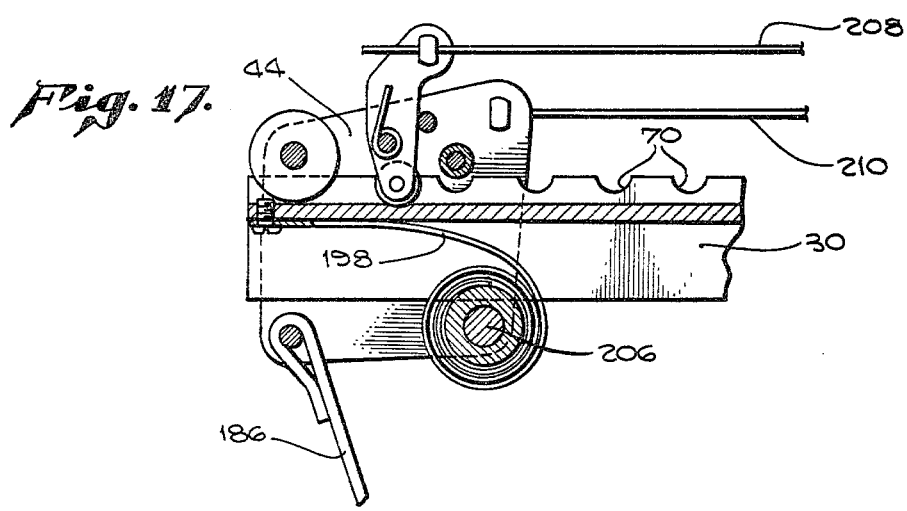
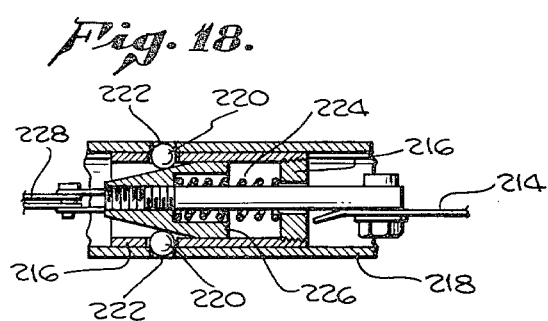
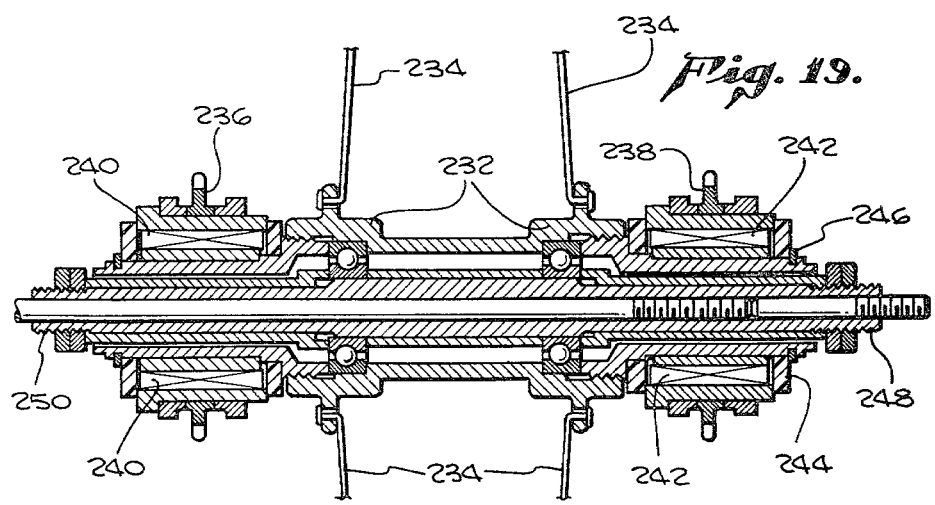

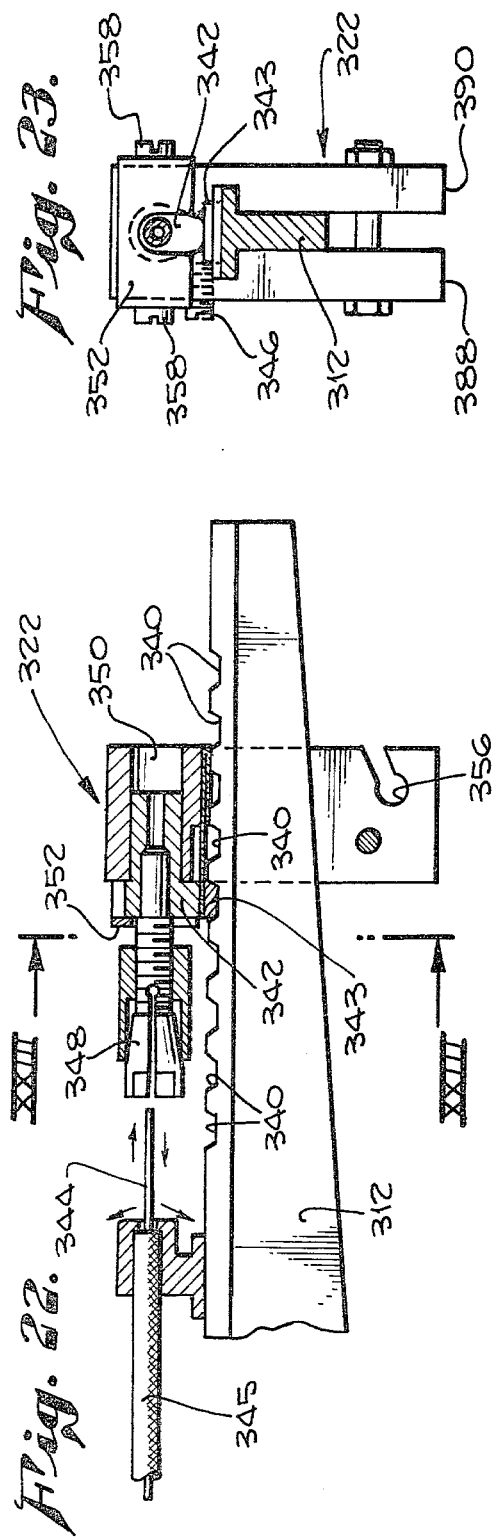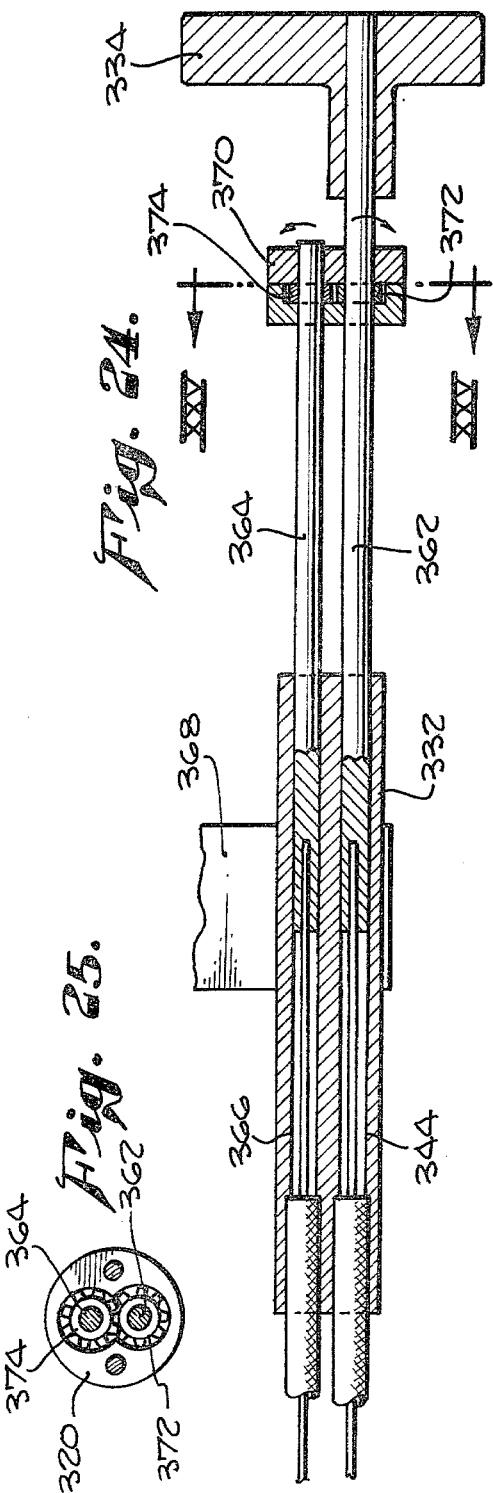

EFFICIENT, VERSATILE OSCILLATING PEDAL CYCLE

REFERENCES TO RELATED PATENT APPLICATIONS

This patent application is related to and is a Continuation-In-Part of my prior U.S. Patent Application Ser. No. 879,220 filed Feb. 21, 1978, and entitled "Powerful Oscillating Pedal Bicycle".

FIELD OF THE INVENTION

The present invention relates to oscillating pedal type cycles.

BACKGROUND OF THE INVENTION

Conventional rotary pedal type bicycles have enjoyed wide usage over the years. They have the advantages of simplicity and ease of manufacture. However, they are also very restricted in their mode of operation and are limited in their capabilities. For example, let us consider a conventional ten-speed bike having a 27 inch wheel diameter, and a ratio of 3.6 revolutions of the rear wheel to 1 revolution of the pedals. Let us further assume that the ten speed bike is in high gear, and that the rider is making 60 strokes per minute with each leg, or one revolution per second of the pedals. Under these conditions the bicycle will be travelling at a speed of approximately 17.3 miles per hour or approximately 25.4 feet per second. No flexibility is provided in the application of power to the pedals. The rider must either fully rotate his legs at the rate of 60 times a minute or he cannot apply force to the rotating wheels. There is no possibility for the rider to shorten his stroke or apply brief impulses of high power to the bike. It is not possible to apply force with both legs to the two pedals simultaneously, if this should be desired. The conventional bike is therefore severely limited in its capabilities, as its mechanical limitations inflexibly dictate the mode of operation of the rider.

Accordingly, an important object of the present invention is to provide a bicycle in which the rider controls the application of power to the bike, instead of having the bike dictate the mode of application of power to it by the rider.

It is also noted with regard to conventional bicycles that the diameter of the circle through which each pedal rotates is about 13 inches. Of course, power is only applied to each pedal on the downward stroke during about 180 degrees. However, to flexibly engage the pedal during the full 360 degrees, the toe normally engages the pedal. Now, at the top of the stroke when pressure is applied downward on the pedal, no force goes into rotating the pedal; and more generally the effectiveness of the force varies as the cosine of the angle, ranging from 100% at 0 degrees (horizontal) to zero at plus and minus 90 degrees when the pedal is at the top and bottom of its stroke. At plus and minus 60 degrees, 50% of the downwardly applied force is effective; and at plus and minus 30 degrees, about 87% of the force is effectively translated into rotational torque, neglecting friction. The average effectiveness, as a result of this factor, in a conventional bike is in the order of 70%, with 30% being lost. In addition, the need to use the toe on the pedal, to accommodate 360 degrees pedal rotation prevents fully effective application of the strength of the leg to the pedal. It is estimated that the resultant reduction in efficiency results in an additional loss of power or more than fifty percent.

Another object of the present invention is, therefore, to increase the efficiency of the application of human power to propel a bicycle.

It is also noted that the driving mechanisms of conventional 10-speed bicycles with their many sprockets and additional parts are relatively complex, having in the order of 80 or more parts. A collateral object of the present invention is to significantly reduce the complexity of variable speed or variable ratio bikes.

As will be developed in greater detail below, the present invention involves an oscillating pedal type cycle. A number of different kinds of oscillating pedal type bikes have been disclosed in the patent literature. However, it appears that the true capability of a properly designed oscillating pedal type bicycle has not been realized, as they are very rarely used, and are virtually never seen in competitive bike races. It is particularly interesting to note that two typical patents which are pertinent to the present invention, B. Ljungstrom, U.S. Pat. No. 556,545, patented Mar. 17, 1896, and British Pat. No. 28,759 of 1896, both date back to the nineteenth century. Further, these patents appear to show designs which are mechanically unsound or at least inefficient, and probably inoperative.

Accordingly, another object of the present invention is to provide a practical oscillating pedal type bicycle which is mechanically sound, which has a minimum number of parts, and minimum maintenance requirements.

BRIEF SUMMARY OF THE INVENTION

In accordance with an important aspect of the invention an oscillating pedal type bicycle or cycle is provided with a pair of pedal levers, each of which has a forwardly extending pedal supporting portion and a rearwardly extending power application portion which are rigidly secured together at an oblique angle, and are centrally pivoted generally under the seat of the rider, with the apex of the oblique angle pointing downwardly and to the rear when the pedals are in their neutral position.

In accordance with another important aspect of the invention, each of the pedal levers may be operated independently, and they are coupled by separate clutches to the rear hub of the bicycle.

In accordance with another aspect of the invention the pedal levers are raised through the use of clips which engage the foot of the rider. These clips may, for example, be heel clips or members which engage the riders instep.

To provide variable drive ratio, the rearwardly extending portion of each of the pedal levers carries a slider which may be locked in position and moved by remote controls operated by the rider with the pedal levers in any orientation. Under the control of a cable or cables connected from the front of the bike to each individual slider, a locking element forming part of each of the sliders is first positively moved to unlock the slider, and then the sliders are moved longitudinally to change the speed ratio.

In the implementation of the slider operation, the rearwardly extending portion of the pedal lever may include two side members, and an interconnecting transverse plate, providing a beam of H-shaped cross-section, with the transverse plate forming a camming surface to release the slider from locking recesses in the pedal lever portion. Other known beam cross-sections such as "T", "U", "I", "L", or cross configuration may be used to provide the desired mechanical strength, locking recesses for the slider in the form of notches or holes in the beams, and camming surfaces to unlock the slider.

In accordance with an additional minor feature of the invention, the pedal levers are provided with forwardly mounted foot platforms which have a pivot point about 3 to 5 inches forward from the rear of the rider's heel.

In accordance with another different aspect of the invention, the distance from the pivot point of the pedal lever to the pivot point of the pedal platform, or the radius of the pedal motion, is preferably about 11 to 14 inches, which is approximately equal to the diameter between pedals of a conventional bike. The full stroke of the new bicycle extends through an arc that is more than 60 degrees and less than 120 degrees (and preferably in the order of 85 degrees) so that the average efficiency is more than 90%.

Another advantage involves the significant reduction in distance travelled by the foot in the present bicycle, as contrasted with conventional bikes. Assuming a stroke from top to bottom of 13 inches, for both a conventional bike and for the present oscillating pedal type bike having a pedal radius (instead of diameter) equal to the same 13 inches, the distance travelled by each foot in a conventional bike will be in the order of 50% greater than with the bike in accordance with the invention. Further, as noted above, the direct extension of the leg and the application of force onto the firm pedal platform results in much higher energy conversion efficiency than is obtained with rotary pedal action using toe engagement required for the smooth pedalling of conventional bikes.

Accordingly, another aspect of the invention allows an effective use of a pedal to perform a cycle powering stroke which may vary from one up to 18 inches.

The foregoing four factors deserve recapitulation:
(1) The first involving the independence in operating the two pedals; (2) The second involving the cosine factor, (3) the third involving fifty percent more travel of the feet with the old style bikes, and (4) the fourth involving direct leg extension onto a firm extended pedal platform, as compared with toe engagement with a narrow pedal in conventional bikes, when these four factors are taken together, the resultant bike even in the prototype stage has substantially superior performance characteristics to the best existing conventional bikes.

In accordance with another feature of the invention, the motion of the rearwardly extending portion of the pedal lever assembly is confined to the space to the rear of the seat and away from the operating positions of the rider's legs and ankles to avoid possibility of injury to the rider, and for cleaner mechanical design.

With regard to the configuration of the pedal lever, it serves to interconnect the driving point where the cabin is effectively connected, the pivot point for the pedal lever, and the pedal mounting point for the pedals or pedal platforms. While the pedal levers may assume various configurations, it is desirable that the three points form an oblique angle with the pivot point being the apex of the angle, and the angle pointing down and to the rear when the pedal lever is in an intermediate position. The oblique angle is preferable more than 145 degrees, and successful results have been obtained using an oblique Additional features which are disclosed in this continuation-in-part patent application, but not in the parent application, include the following:

1. The forward portion of the pedal lever between the pivot point and the pedal is bent to increase the length of the stroke and in one design to avoid interference with the chain spring retractor.

2. The rearwardly extending portion of each of the pedal levers may be of T-shaped or L-shaped configuration, or other beam configurations of high mechanical strength and low weight.

3. The retractor spring secured to the lower end of the bicycle chain may be mounted at a point between the pivot point of the pedal lever and the point of attachment of the pedal lever when it is at the lowest point of the power stroke.

4. The slider mechanism for changing the bicycle gear ratio may be controlled by a cable which is both shifted in longitudinal position and also rotated, so that the slide movement and its locking may be independently controlled by a single cable.

5. Each chain may be provided with quick release arrangements both at its upper end where it engages the movable slider on the pedal lever and also at its bottom end where it is secured to the constant force strip-type spring.

6. The plane of each chain may be displaced inwardly toward the frame of the bike out of the plane of movement of the pedal levers to permit greater flexibility in design.

7. Each chain retractor spring may be secured to the forward portion of the pedal lever to provide a degree of automatic tension adjustment as the chain is operated.

In accordance with an important advantage of the new design, the length of stroke may be increased to close to 20 inches, without interfering with the mounting of the chain retractor spring or otherwise interfering with good bicycle design requirements.

Other objects, features, and advantages of the invention will become apparent from a consideration of the drawings and from the following detailed description.

BRIEF DESCRIPTION OF THE DRAWINGS

FIGS. 4 and 5 are side and top views, respectively, of the rear portion of the pedal lever and the slider mechanism for changing the speed or power ratio of the bicycle;

FIG. 6 is an alternative speed changing arrangement;

FIG. 7 is a further alternative speed or ratio changing system;

FIG. 8 is a diagrammatic showing of the controls for unlocking the speed changing mechanism and for changing the position of the slider to change the speed ratio;

FIG. 9 shows an alternative slider actuation arrangement for changing speeds;

FIG. 13 is a diagrammatic showing of arrangements for orienting the pedal platform relative to the pedal lever;

FIG. 14 is a further alternative speed changing arrangement;

FIG. 15 shows a single cable speed changing arrangement;

FIG. 16 shows an alternative drive arrangement using belting instead of chains;

FIG. 17 shows an alternative arrangement in which the driving belt is secured to the slider of the speed changing mechanism;

FIG. 18 shows one additional speed changing arrangement;

FIG. 19 is a cross-sectional view of the dual clutch mechanism for supplying power from each of the two chains connected to the respective pedal levers to the rear wheel;

FIG. 22 is a partial cross-sectional view of the gear changing slider and its associated control mechanism;

FIG. 23 is a partial cross-sectional view taken along lines XXIII-XXIII of FIG. 22;

FIG. 24 is a cross-sectional view of the control mechanism employed for changing gears as shown in FIG. 20;

FIG. 25 is a partial cross-sectional view taken along lines XXV-XXV of FIG. 24.

DETAILED DESCRIPTION

Figure 1:
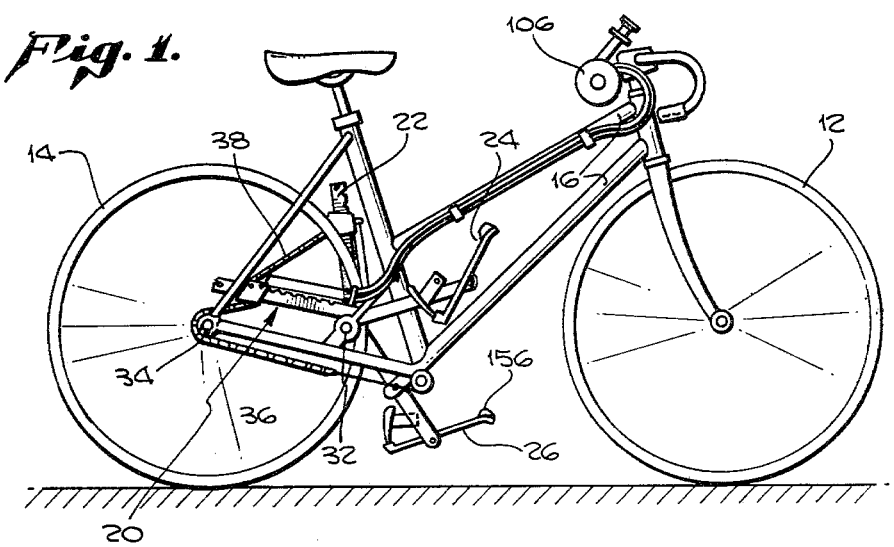
FIG. 1 is an overall diagrammatic view of a bicycle illustrating the principles of the present invention.

Referring more particularly to the drawings, FIG. 1 shows an oscillating pedal type bicycle including a front wheel 12, a rear driving wheel 14, a frame 16 which happens to be in the form of a woman's type bike, and a seat 18.

The bicycle is provided with two pedal levers 20 and 22, with the pedal lever 20 being on the near side of the bike, and pedal lever 22 being to far side of the bike frame, as shown in FIG. 1. Pivotally mounted at the front of the pedal levers are the pedal platforms 24 and 26. These pedal platforms are arranged with the pivot point in the order of 4 to 5 inches forward the position of the heel of the rider in order to provide more direct power from the rider's leg onto the front end of the pedal levers, instead of the usual application of pressure by the toe of the rider onto the pedals.

Figure 2:
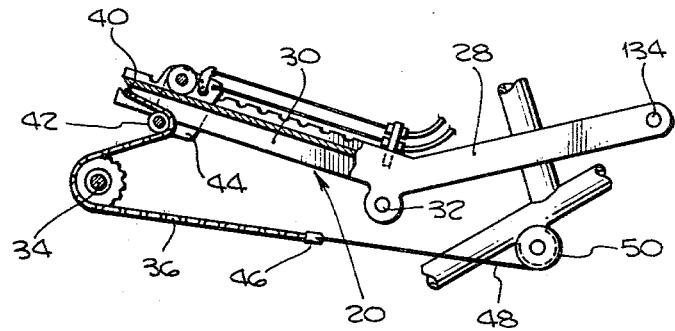
FIG. 2 is an enlarged side view of one pedal lever and associated apparatus used on the bike of FIG. 1.

The pedal lever 20 and associated mechanism are better shown in FIG. 2 of the drawings. More particularly, the pedal lever 20 includes a front pedal supporting member 28 and a rear power transmission member 30. These two members are fixedly secured together, and made an oblique angle with one another. The apex of this oblique angle points downwardly and to the rear. The oblique angle as shown is approximately equal to 150°, but it is contemplated that it could extend from about 120° to about 170°. The centrally located pivot point 32 is located substantially intermediate the two members, and secures the pedal lever 20 to the frame of the bicycle. The pedal levers are provided with lower stops, including stop 29 as shown in FIG. 1. This stops the pedal platform about three to five inches above the ground and provides a full range of arcuate movement for the pedal levers of somewhat less than 90°.

The rear wheel of the bicycle 14 is driven through clutches which are included in the hub 34. The hub 34 may be provided with two sprocket gears, one for each of the chains 36 and 38 associated with the pedal levers 20 and 22, respectively.

In one embodiment of the invention, as shown in FIG. 2, the chain 36 is secured to the end of the member 30 at point 40. It extends over roller 42 on slider 44 which is selectively locked in position at different points along the length of the driving member 30 to determine the speed or ratio of the bicycle. The other end 46 of the driving chain 36 is secured to the constant tension flat roll-type spring 48 which is mounted on drum 50, pivotally mounted on the frame.

Figure 3:
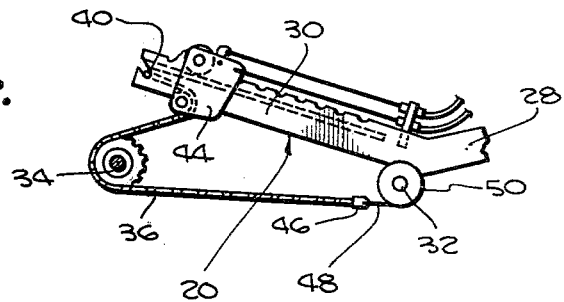
FIG. 3 shows an alternative arrangement for mounting the chain restoring spring for the present illustrative bicycle.

FIG. 3 shows a slightly modified version of the arrangement shown in FIG. 2, in which the constant tension spring 48 is mounted on the drum 32, and to the bicycle frame at the point where the pedal lever 20 is pivoted.

The details of the locking and release mechanism for the slider 44 over which the chain 36 passes are disclosed in FIGS. 4 and 5. More specifically, the chain 36 normally exerts a force directed to the left as shown in FIG. 4. The member 30 is actually made up of two side plates 52 and 54 bridged by a transversely extending plate 56 upon which the roller 58 pivotally secured to the slider 44, rides. In FIGS. 4 and 5 two cables 60 and 62 are shown with their outer coaxial sleeves secured to the pedal lever member 30 by the bracket 64. The movable wire 66 which slides within the outer housing 60 is actuated to release the slider 44 from its normally locked position in which the locking axle 68 is located within one of the recesses 70. The release function is accomplished by camming member 72 which pivots in the slider 44 at point 74. When tension is applied to the upper point 76 of the camming member 72, the rear of slider 44 is raised as the roller 78 presses against transversely extending plate 56. This action raises locking axle 68 out of the recesses 70 in plates 52 and 54 so that it is free for longitudinal movement.

With regard to longitudinal movement of the slider 44, it is normally biased to the rear by the force of the chain 36. On the other hand, the application of tension to cable 80 moves the slider 44 to the right, as shown in FIG. 4, thereby reducing the amount of travel of the chain 36 for a given angular movement of the pedal lever member 30. On the other hand, when it is desired to go faster, and to increase the ratio of wheel rotation to angular movement of the pedal lever member 30, the slider 44 is shifted to the left, and the locking axle 68 is located in one of the outer sets of recesses 70 on the member 30. This movement to the left may be accomplished by operating the release cable 66 and then relaxing tension on the cable 80 so that the slider 44 will move to the left under the force provided by the chain 36.

Referring now to FIG. 6, an alternative slider 44' is riding on the pedal lever member 30'. The pedal lever member 30' is provided with recesses 70' which are slightly assymetric, to counteract the normal biasing force exerted by the chain 36 toward the rear of the member 30'. In practice, the position of the slider 44' is controlled by the cable 82 which is movable within the outer concentric cable housing 84, which has its lower end secured to the member 30' by the bracket 86. The position of the slider 44' is controlled by the camming and control member 88, pivoted at point 90 and having the camming member 92 rigidly secured to it. The pin at point 90 normally drops down into one of the recesses 70'. However, when tension is applied to the cable 82, the member 88 and its associated cam 92 turn counter-clockwise to raise the right-hand side of slider 44', and lifts the locking member at point 90 out of recess 70'. Further tension on cable 82 following engagement of camming member 88 with stop 91 shifts the slider to the right to lower speed ratio. On the other hand, after initial actuation, gradual release of cable 82 permits the movement of the slider 44' to the left, and it may be notched along to higher speeds and higher gear ratios by the successive application of light tension to the cable 82. The spring 94 normally biases the member 88 in clockwise direction. Spring 96 normally pushes the slider 44' downwardly to insure engagement of the locking pin at point 90 in one of the recesses 70', despite bouncing of the bicycle or other vibration.

As shown in FIG. 7, the arrangement of FIG. 6 may be provided with an additional cable 98 having an inner actuating member 100 to provide separate movement control for the slider 44' along the pedal lever member 30'. Under these conditions, the cable 84 may be mounted by bracket 102 to the movable slider 44', rather than to the arm 30' as shown in FIG. 6. Of course, the end of the outer concentric sleeve 98 enclosing the tension member 100 is secured to member 30' by bracket 104.

FIG. 8 shows a cable control drum assembly 106 mounted by bracket 108 to the front frame or to the handle bars of the bicycle where it may be easily reached by the rider. Initially, it may be noted that the arrangement of FIG. 8 is intended for association with the two cable arrangements shown in FIG. 7. More specifically, note that the outer concentric housing 98 passes through bracket 108, and is therefore rigidly held to the frame of the bicycle. In order to shift the position of the slider, by moving the cable 100, the entire drum assembly 106 is rotated on the bracket 108, by grasping the handle 110. Note that the release cable is mounted by bracket 112 onto the drum assembly 106 to rotate with it. Accordingly, when it is desired to unlock the slider mechanism, the smaller handle 114 is moved in the clockwise direction to apply tension to cable 66 and raise the locking axle out of the locking recess in arm 30'. Once the slider is unlocked, the speed or ratio of the bike may be changed by moving the position of the slider through the rotation of the drum assembly 106 under the control of handle 110.

Of course, with some of the other alternative arrangements, slightly different cable actuating mechanisms would be required. It may also be noted that, either one or two of the assemblies 106 may be provided. More specifically, if it is always desired to actuate both pedals with precisely the same gear ratio, then a single assembly 106 may be provided, with the cables for both of the two sliders secured thereto. However, if a rider has one leg which is somewhat weaker than the other and wishes to have a different ratio, then it is quite practical to provide two drum assemblies so that one of the pedal lever members 30 may be adjusted to a high ratio while the other is at a somewhat lower ratio.

FIG. 9 shows another alternative method for unlocking and shifting the slider mechanism 44 on the rearwardly extending portion 30 of the pedal lever which is pivoted at 32. In the arrangement of FIG. 9, the cable is provided in which the inner wire 116 and the outer concentric portion of the cable 118 move together in order to change the position of the slider 44, but the inner wire 116 is shifted relative to the outer concentric portion 118 in order to unlock the detente 120 from the recess 70 in which it is seated when in the locked position. More specifically, as in the case of certain of the earlier embodiments, the slider 44 is provided with the wheel 58 which rides on the cross plate 56, and the release mechanism 122 is pivoted about point 124 under the control of cable 116 to force field 126 into engagement with the plate 56 so that dentente 120 is raised out of any one of the recesses 70 in which is may be locked. Thereafter, the entire cable 118 and 116 is moved to permit the slider 44 to move along the rearwardly extending portion 30 of the pedal lever. This movement of slider 44 on number 30 may be either under the force of the chain 36, as described above, which would move the slider to the left as shown in FIG. 9, or by rotation of a drum on which the cable 118 and wire 116 may be wrapped, to move it to the right as shown in FIG. 9 against the spring pressure on the spring 36. In practice, the actuating mechanism for the concentric cables 116 and 118 of FIG. 9 may be substantially as shown in FIG. 8, with the entire cable including the outer concentric portion 118 being secured in a manner similar to cable 60 as shown in FIG. 8 to extend around and be actuated in its entirety by the rotation of the drum 106, but with the lever 114 supplementally moving the inner cable 116 relative to the outer concentric portion 118 which is fixed to the drum (not the frame of the bicycle). Of course, with the arrangement of FIG. 9, the outer concentric portion 118 of the cable must move longitudinally, and rollers such as the externally grooved roller 128 shown in FIG. 9 are provided on the frame of the bicycle between the drum 106 end the pulley or roller 128.

Figure 11:
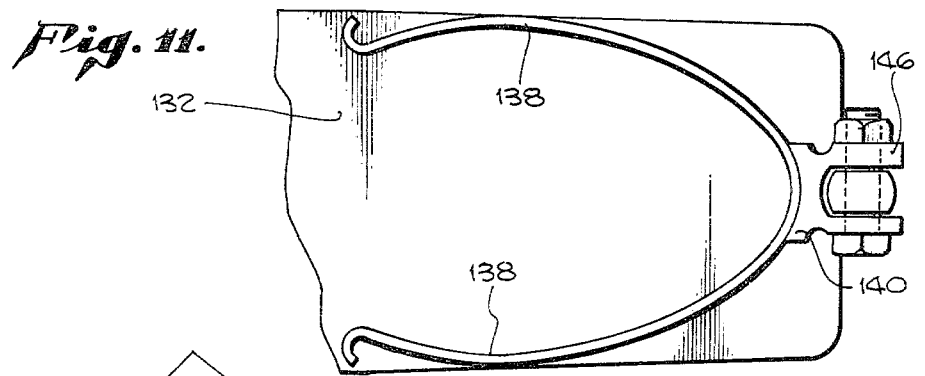
FIGS. 10 and 11 are side and top views, respectively, of pedal platforms for supporting the feet at the front end of the pedal levers and heel clips associated with the pedal platforms.
Figure 10:
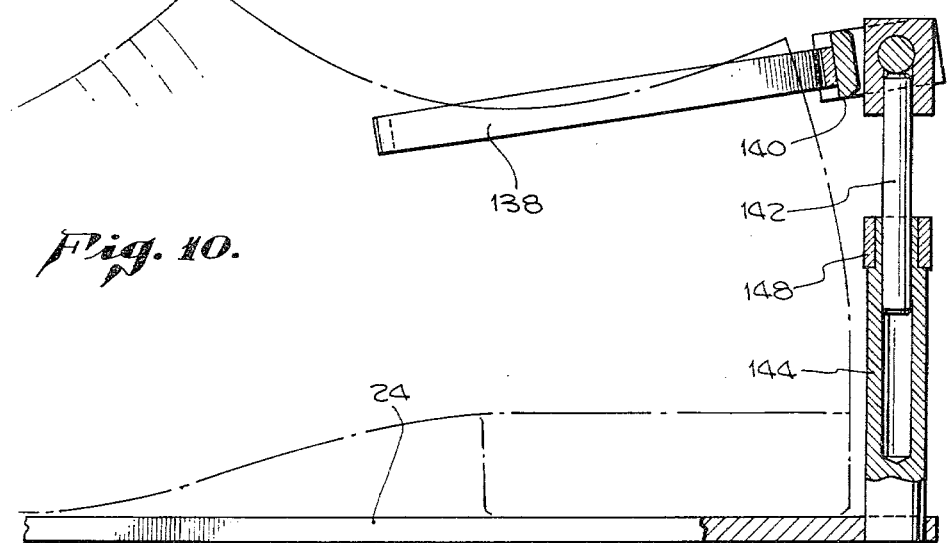

FIG. 10 is a schematic showing of one of the pedal platforms 24 pivotally mounted at the front end of forwardly extending portion 28 of the pedal lever 20, as shown in FIGS. 1 and 2. Referring again to FIG. 10, the pedal platform assembly 24 includes an underlying plate 132 which is pivotally mounted to the forward pivot point 134 (see FIG. 2) by bracket 136. Heel clips 138 are preferably provided for each of the pedal assemblies, such as assembly 24, and these may be adjustably mounted to the underlying plate 132 by the bracket 140 pivotally secured to the vertically extending member 142, which is in turn adjustably mounted to extend within the hollow lower support member 144. The spring heel clips 138 may be adjusted to the proper size for the rider and then clamped in the proper position by the clamping mechanisms 146 and 148 which may be of any suitable configuration. As previously mentioned, it has been determined that the preferred way of raising the pedals and restoring them to their upper positions between strokes is through the use of heel clips secured to the heels, and by providing the motive power by the rider. This permits freedom of control by the rider without arbitrary constraint forced upon the rider by the mechanism of the bike. Other oscillating pedal type bikes have provided restoring springs, or interconnecting mechanisms whereby the depressing of one pedal raises the other pedal; however, such arrangements have introduced unnecessary back or reverse pressure, or have unduly constrained the mode of operation of the bike. Accordingly, the inventor has determined that restoration under the control of the rider through the use of heel clips, such as those shown in FIGS. 10 and 11, are to be preferred.

Figure 12:
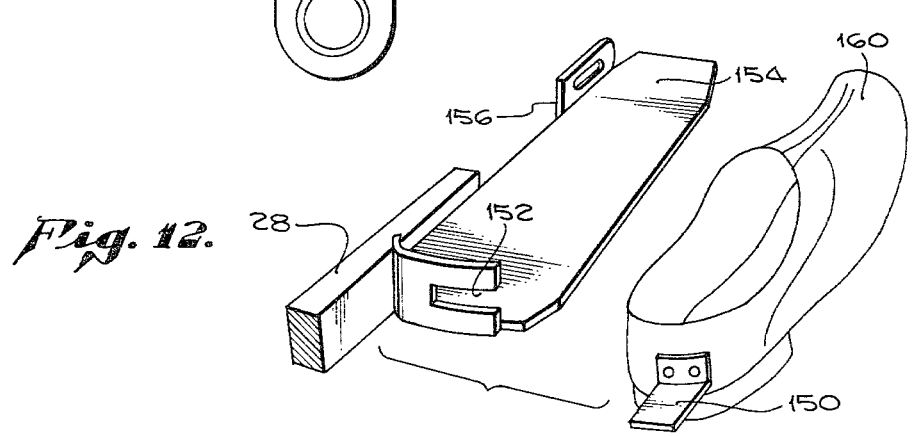
FIG. 12 shows an alternative pedal lever platform and associated heel engagement arrangements.

FIG. 12 shows an alternative arrangement in which a special shoe is provided with a metal attachment 150 for engaging the slot 152 mounted at the rear of the pivoted pedal platform 154. As in the previous example, the pedal platform 154 is pivotally mounted on the forwardly extending portion 28 of the pedal lever. An additional bracket 156 is provided for engagement with the front left-hand side of the shoe 160. The arrangement of FIG. 12 is primarily intended for racing bike users in which special shoes may be employed.

FIG. 13 is a diagrammatic showing of the mode of biasing or orienting the pedal platforms, such as pedal platform 24 mounted at the front end of the forwardly extending portion 28 of pedal lever 20 (see FIGS. 1 and 2). In FIG. 13 a torsion spring 162 is employed to orient the pedal platform 24 relative to the pedal lever 28. More specifically, in the absence of the torsion spring 162, the high center of gravity of the pedal platform assembly 24 could turn it over so that a rider could not easily place his foot upon it. Accordingly, the orientation of the pedal platform assembly 24 relative to the end of the forwardly extending portion 28 of the pedal lever is determined by the torsion spring 162. One end of the torsion spring 162 extends through the opening 164 in the upwardly extending bracket 166 forming part of the pedal platform assembly 14. The other end 168 of the torsion spring 162 may be inserted into any one of a series of holes 170 in the end of the pedal lever, so that the proper angular orientation of the pedal platform assembly is obtained. In practice, instead of being located immediately between the pedal platform assembly and the front end of the pedal lever, and taking up the considerable amount of lateral space shown in FIG. 13, the spring can be of greatly reduced extent, and may be on the inner side of the front end of the pedal levers, with the pivot rod 172 extending through to the left-hand side of pedal lever portion 28, as shown in FIG. 13, and being rigidly secured to the pedal platform assembly 24. The torsion spring could then be secured to the pivot rod 172 and hold it in the desired orientation relative to the pedal lever.

FIG. 14 shows yet another arrangement for unlocking the slider 44 from the rearwardly extending pedal lever member 30 and shifting its longitudinal position. More specifically, in the arrangement of FIG. 14, unlocking is accomplished by the cable 176 which rotates the circular camming member 178 about the combined pivot point and locking rod 180. FIG. 14 shows the locking rod 180 raised up out of the locking recesses 70, with the roller 178 riding on the transversely extending plate 56. With the slider 44 unlocked from the rearwardly extending member 30, the position of the slider 44 may be moved by actuation of the cable 182 which is secured to the member 30. By rotating the drum 106, as shown in FIG. 8, with the release lever 114 depressed, the slider may be moved to the left or right to change the speed ratio of the bicycle. FIG. 14 is of interest in showing an arrangement in which the speed ratio control cable 182 operates below the member 30, while the release cable 176 operates above the member 30.

FIG. 15 is of interest in showing an arrangement in which a slider 184 is moved along the rearwardly extending member 30 by a single movable cable 186. In operation, the detente 70 is initially is raised up out of the recess 70 in which it is located, and then the slider 184 moves to the right as shown in FIG. 15, to shift the detente 188 to the next subsequent locking recess 70.

Further, when it is desired to shift the bicycle to a higher speed ratio, the cable 186 may be momentarily pulsed, and then released so that the detente 188 would move upward and to the left as shown in FIG. 15 under the pressure of the chain 36.

FIG. 16 shows an alternative arrangement in which a flexible belt or cable 192 is employed instead of the chain 36 shown in other embodiments of the invention. The belt 192 is secured to and wraps around the hub 194 at the rear wheel of the bicycle. The hub 194 is coupled to the rear wheel by means of a roll type locking clutch with very little back play, as will be described below. The hub 194 is biased in on angular orientation by the spring return 196 which is indicated schematically in this figure. A flat constant force spring 198 is secured to the outer end of member 30 by bolt 200, and is pivotally mounted on the slider 44 to bias it toward the end of member 30. Cable or belt 202 is actuated to both unlock and move the slider 44 along the length of the member 30, as in earlier embodiments of the invention.

FIG. 17 shows another embodiment of the invention employing a drive belt, instead of a chain. The drive belt 186 is secured to the movable slider 44, which as shown is mounted near the outer end of the rearward extending portion 30 of the pedal lever. The constant force spring 198 is secured to the outer end of the member 30, and is rotatably mounted on the slider 44 at pivot point 206 to urge the slider 44 toward the outer end of member 30. Locking and unlocking of the slider 44 is accomplished by cable 208 in a manner discussed hereinabove in connection with other embodiments of the invention, and movement of the slider 44 along the length of member 30 is accomplished by the cable 210.

FIG. 18 shows an alternative arrangement in which a single cable 214 performs both the unlocking and the control function for moving a slider 216 in a rearwardly extending portion 218 of a pedal lever. In FIG. 18, as shown, the balls 220 extend outwardly into the locking recesses 222 in member 218. When the cable 214 is tensioned and moved to the right, the initial action is to compress spring 224, with element 226 moving to the right to engage the main portion of slider 216 which lies to the right of the movable member 226. When this occurs, the balls 220 move inwardly to release the slider 216 so that it may move either to the right under continued tension exerted on cable 214, or to the left under the force of the chain or belt 228 secured to the slider 216.

FIG. 19 shows the rear wheel hub assembly. More specifically, the wheel hub 232 supports the spokes 234 which extend outwardly and are connected to the rim of the wheel which carries the tire. The two outer sprockets 236 and 238 receive the chains which are connected to the rearwardly extending portions of the pedal levers 20 and 22 as shown in FIG. 1. Immediately within the sprockets 236 and 238 are the roller clutches 240 and 242, respectively, which transmit torque on a unidirectional basis to the wheel hub 232. Roller clutches perform a function similar to a ratchet in that torque is transmitted in one direction, but not in the other. However, roller clutches of modern design have virtually no lost motion and are virtually instantaneously put into operation upon reversal of motion. Typical clutches which are suitable are disclosed in Torrington Catalog No. RC-8. Mounted outside the clutch 242 is a plastic washer 244, which is held in place by a retaining ring 246. A similar washer and retaining ring is located at the other end of the assembly. The frame of the bicycle is mounted on the treaded surfaces 248 and 250, and is held in place by the usual retaining nuts. The other components shown in FIG. 19 are generally conventional.

In closing, certain features of the invention and their significance may be noted. First, as a result of the configuration of the rearwardly extending portions of the pedal levers, such as portion 30 of pedal lever 20, the driving chain 36 may be relatively short. More specifically, it is preferably in the order of 16 to 20 inches long for a 27 inch wheel, with a shorter range of lengths being appropriate for smaller bikes, or bicycles with a reduced range of speed ratios. This short length precludes the transverse vibrations which tend to plague the operation of bicycles having extended tension members. In addition, the inertia of the reciprocating chain assembly is held to a minimum in that the only other working part that moves back and forth with it is the sprocket gear on hub 34, the flat constant tension spring 48, and the lightweight coupling between spring 48 and the short bicycle type chain 36. Incidentally, the spring 48 has a tension of only about three and one-half pounds, and is preferably between two and one-half and five pounds.

Another minor feature involves the provision of the vertical toe plates such as 156 on the inner side of the pedal platforms, to prevent inadvertent inward sliding of the front of the shoe into engagement with the frame of the bicycle.

By way of transition, FIGS. 1 through 19 described hereinabove were included in my U.S. Pat. Application 879,220, filed Feb. 21, 1978, of which this patent application is a continuation-in-part. The following description of FIGS. 20 through 31 were not included in that prior patent application and represent an improved bicycle design.

Figure 20:
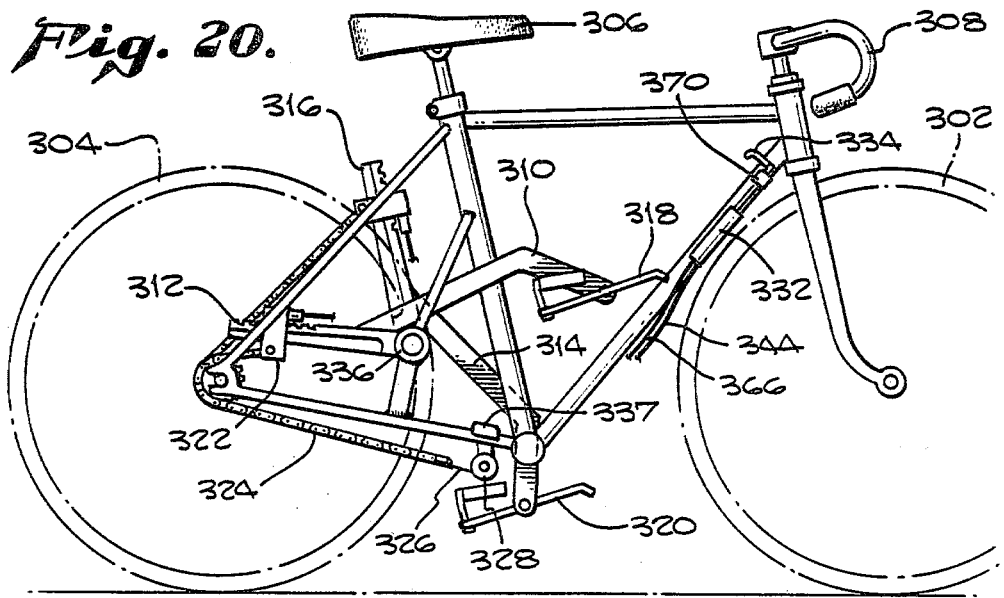
FIG. 20 is a side view of an improved embodiment of the invention.

With reference to FIG. 20, this bike is similar in many respects to that described hereinabove in connection with FIGS. 1 through 19. The bike includes the front wheel 302, the rear wheel 304, the seat 306, and the handlebars 308. The part of the bike which is of greater interest to us in connection with FIG. 20 is that relating to the drive mechanism, and specifically including the two pedal levers, with the one in the foreground including a front portion 310 and a rear portion 312, and the one in the background including a front portion 314 and a rear portion 316 which is nearly in the vertical orientation. Suitable pedal platforms as described hereinabove are mounted on the pedal levers at 318 and 320. Associated with the front pedal lever, as shown in FIG. 20, is the slider 322 which may be moved along the rear portion 312 of the pedal lever to change the effective gear ratio of the bike, the chain 324 which drives the bike, and the constant force spring 326 which is secured to the other end of chain 324 and is mounted at the point 328. The chain and spring associated with the rear pedal lever, as shown in FIG. 20, is not visible, but the two constant force springs are mounted coaxially at a point 328 on either side of the frame and rear wheel 304.

A gear changing and locking control mechanism 332 is provided with a handle 334, and the entire unit is mounted conveniently on the bicycle frame.

Figure 21:
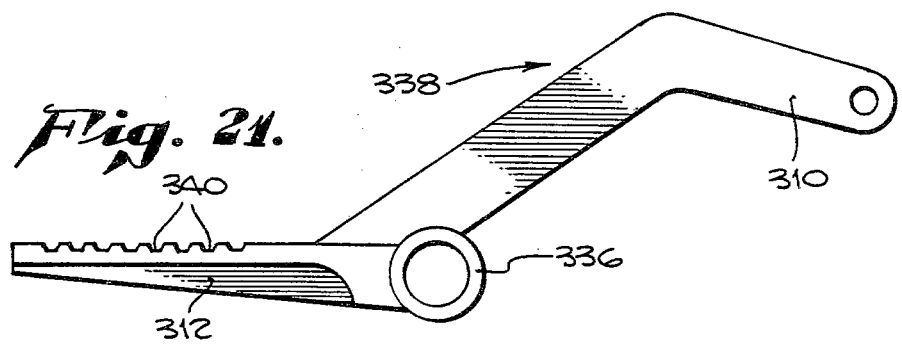
FIG. 21 is a side view of one pedal lever which may be utilized with the bicycle of FIG. 20.

FIG. 21 is an enlarged showing of one of the pedal levers including the forward portion 310 and the rearwardly extending portion 312, which has a central pivot journal 336. It may be noted that the forward portion 310 of the pedal lever is bent up in the region 338. As shown in FIG. 20, this permits a longer stroke for the forward portion of the pedal lever without interfering with the mounting point 328 for the constant force spring retractors for the chain.

Incidentally, the stop structure 337 provides resilient material in the path of both of the two pedal lever members 310 and 314, to stop their downward travel, and to preclude their inpingement on the ground.

FIGS. 22 and 23 illustrate one gear changing arrangement for the bicycle of FIG. 20. More specifically, the upper surface of the rearwardly extending portion 312 of one of the pedal levers is provided with a series of notches or recesses 340 into which the slider 322 is secured by a detent 343, and held by cam 342. With the detent 343 and cam 342 oriented as shown in FIGS. 22 and 23, detent 343 engages one of the recesses 340, and prevents the slider assembly 322 from moving up or down the member 312. When it is desired to change gears, the cable 344 is rotated, and the cam 342 is moved out of engagement with the stop 346, thereby unlocking the detent 343 and permitting free longitudinal movement of the slider assembly 322 as a result of the angle between detent 343 and the end wall of recess 340, as a result of the longitudinal force on slider 322. Such longitudinal movement is accomplished by the action of the cable 344 as it is moved from left to right or vice versa as shown in FIG. 22. The cable 344 is clamped by the clamping mechanism 348 onto the assembly 322, and more specifically in engagement with the rotating detent 342. This rotating detent 342 is in turn journalled within the opening 350 in the slider housing 322, and is retained in position by the heavy sheet metal bracket 352 which extends around the rear of the detent member 342. The upper end of the chain 324 (see FIG. 20) is secured in the recess 356, so that it may be readily detached when the bike is to be disassembled or repaired. Incidentally, the bolts 358 hold the retaining bracket 352 in place.

FIGS. 24 and 25 show the controls for the gear changing arrangements which appear in FIG. 20 at reference numerals 332 and 334, with 334 indicating the handle. The handle 334 is pulled or pushed to control the longitudinal position of the rods 362 and 364 and their associated cables 344 and 366, respectively. Incidentally, the assembly 332 is secured to the frame by suitable brackets such as the bracket 368. The gear box 370, including the gear 372 secured to shaft 362, and the gear 374 secured to shaft 364 cause the shafts to rotate in opposite directions simultaneously, when the handle 334 is turned. As discussed above, this rotation of the handle 334, and the corresponding rotation of cables, including cable 344, rotates the cam 342 to bring the detent 343 (see FIG. 23) into engagement with one of the recesses 340 on the upper surface of the number 312 so that the gear changing slider is locked in position. Of course, rotation of the handle 334 in the opposite direction releases the detent 343 and permits the changing of the effective gear ratio by the longitudinal movement of the slider 322 when the handle 334 is pulled or pushed. Of course, prior to changing the gear ratio by longitudinal movement of the handle 334, it must first be rotated to release the detent 343, as discussed above. Incidentally, the outer housing 345 for cable 344 is fixed at one end to assembly 332, and at the other end to the rear portion of the pedal 312, see FIG. 22.

Figure 26:
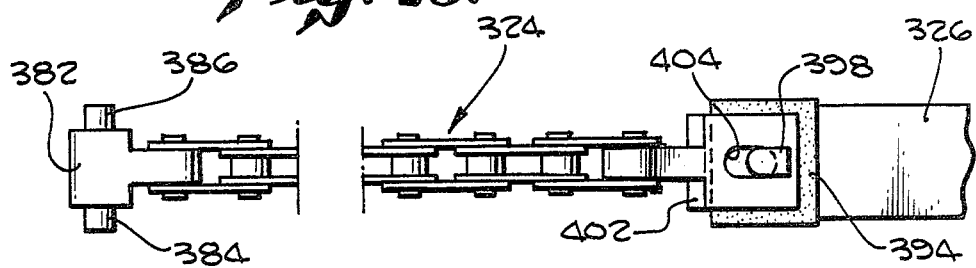
FIGS. 26 and 27 are top and side views of the quick release arrangements for the drive chain of the present bicycle.
Figure 27:
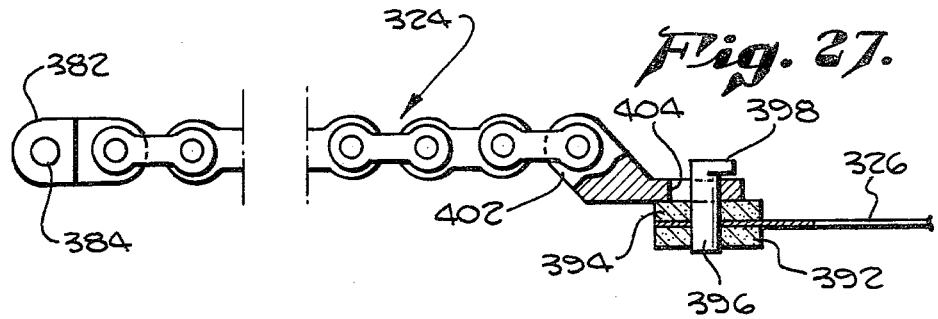

FIGS. 26 and 27 show top and side views, respectively, of the chain 324 and the quick release arrangements for securing the chain 324 to the slider 322 and the constant tension spring 326. More specifically, at one end the chain is provided with a coupling member 382 which has a central width between pins 384 and 386 which is a close fit to slide between the members 388 and 390 of slider 322 as shown in FIG. 23. In addition, the pins 384 and 386 are sized to fit into the openings 356 in both member 388 and 390.

The constant tension strip spring 326 is provided with a pair of clamping members 392 and 394 and a transversely extending pin 396 having an extension 398 which is directed toward the main portion of the spring 326. The chain 324 is provided with an end member 402 having an opening 404 for receiving and engaging the pin 396. Accordingly, with the arrangements as shown in FIGS. 26, 27 and 22, the chain 324 may be released both from the slider 322 and from the constant tension spring 326 in a matter of seconds. On the other hand, once the members are assembled, the tension of the spring 326, and the close fit of the elements in operation, prevent their inadvertent release.

Figure 28:
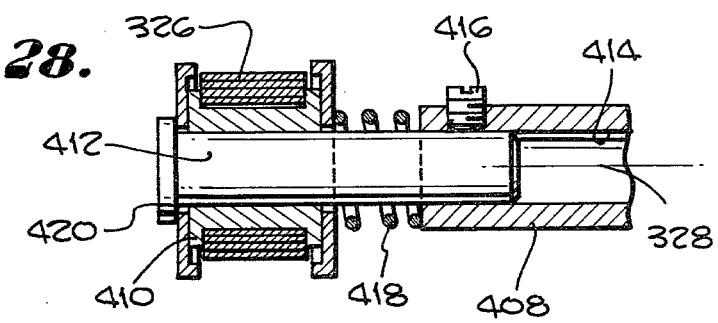
FIG. 28 is a schematic showing of the constant force metal strip type spring employed to tension the bicycle chain.

FIG. 28 shows the arrangements for mounting the constant tension spring 326 on the bicycle frame member 408, at the position 328 which appears in FIG. 20 of the drawings. The spring 326 is mounted in a spool shaped holder 410 which is freely rotatable on a mounting pin 412 which is adjustably secured into the opening 414 in the bicycle frame 408 by a set screw 416. The spring 418 maintains the housing 410 in engagement with the enlarged head 420 of the pin 412.

Figure 30:
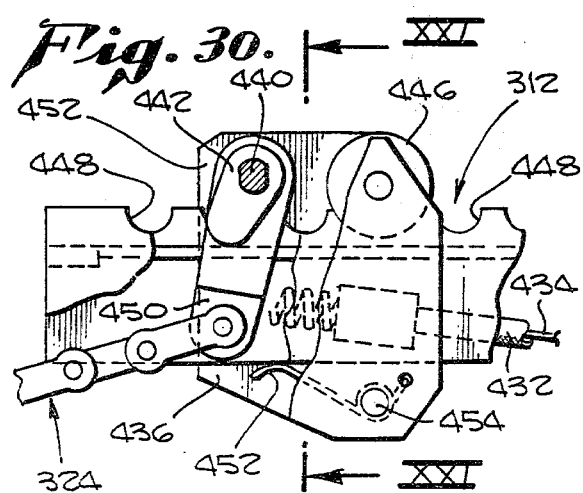
FIG. 30 is a side view of the construction shown in FIG. 29.
Figure 31:
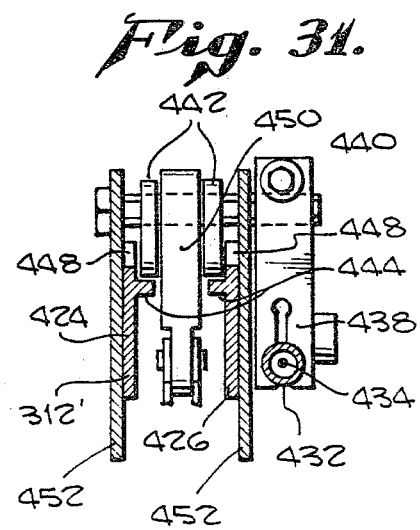
FIG. 31 is a partial view taken along lines XXXI-XXXI of FIG. 30.
Figure 29:
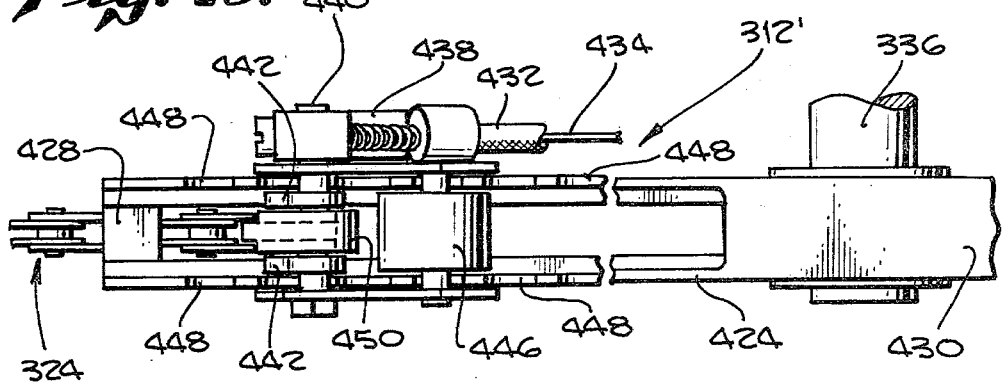
FIG. 29 is a top view of an alternative gear changing arrangement.

Instead of the rearwardly extending portion of the pedal levers being of T-shaped configuration, as shown in FIGS. 21, 22 and 23, an open "H" type configuration may be employed as shown at 312' in FIGS. 29, 30 and 31. More specifically, the central portion of the rearwardly extending member 312', as shown in FIG. 29, includes two side frame members 424 and 426, which are secured together, both at the their outer ends by element 428, and toward the pivot point 336 by the webbing 430. In operation, the slider arrangement of FIGS. 29 through 31 is similar to that of FIG. 28 as disclosed hereinabove. More particularly, the cable 432 with its inner movable wire 434 serves to both move the slider longitudinally on the member 312' and also to selectively release the latching mechanism. In addition, the arrangements for operating the cable 432 would not be as shown in connection with FIGS. 24 and 25 of the drawings, but would be as described hereinabove in connection with FIGS. 8 and 9.

The outer concentric portion of the cable 432 is secured to the main body of the slider 436. The inner wire 434 is secured to the cam actuator lever 438 which turns the shaft 440 about its axis when the central wire 434 is moved longitudinally relative to the outer concentric cable member 432. Secured to the shaft 440 to rotate with it are two cam members 442, which bear on the inwardly extending rails 444 secured to the side members 424 and 426 of the pedal lever portion 312'. The roller 446 also rides on the inwardly extending rails 444. When the bike is "in gear" and the slider 312' is firmly secured to the rearwardly extending pedal lever portion 312', the rounded portion of the shaft 440 which overlies the upper scalloped edges of the support members 424 and 426, is fitted firmly into one of the recesses 448 in the upper edge of each of the beams 424 and 426. However, when the wire 434 is actuated, the release lever 438 is moved relative to the main portion of the slider body 436, and the rear portion 452 of the slider assembly 436 is raised. When the rear of the slider 436 pivots upwardly about the roller 446 under the action of the cams 442, the shaft 440 is raised up out of the recesses 448, and the entire slider assembly 436 is free to be moved longitudinally on the pedal lever member 312' when the entire cable 432 is shifted axially in one direction or the other.

Concerning other arrangements shown in FIGS. 29 through 31, the chain 324 is secured to the member 450 which is pivotally mounted for free rotation on the center of the shaft 440. Spring elements 452 are mounted on a pin 454 to bias the slider assembly 436 counterclockwise about the roller 446 to maintain the shaft 440 in engagement with the recesses 448 when the cams 442 are not operated.

Figure 32:
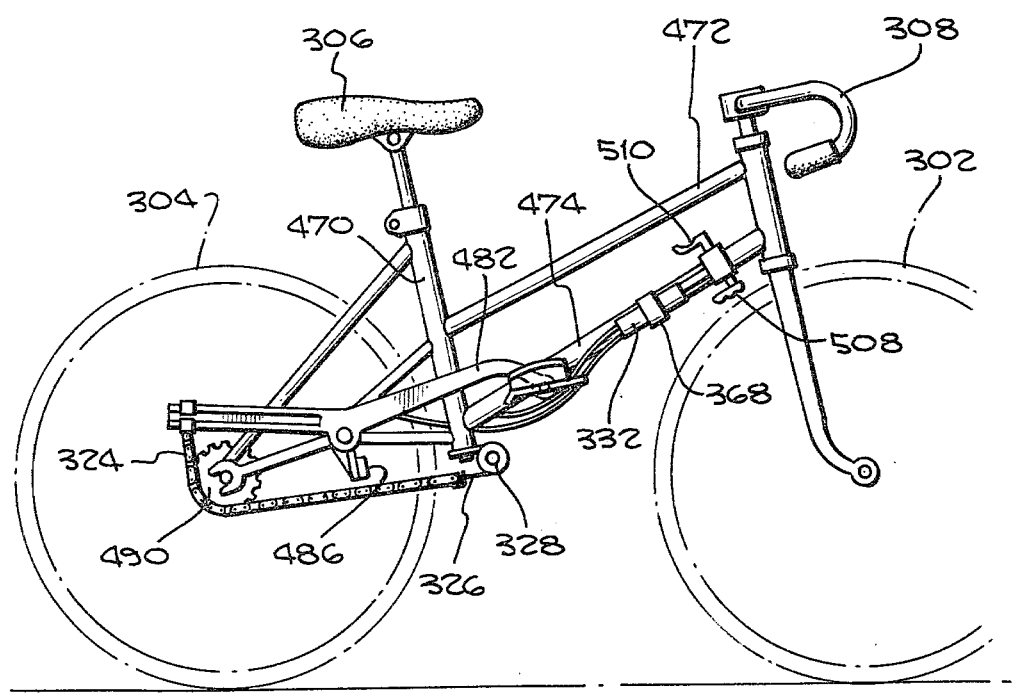
FIG. 32 is a side view of an alternative cycle configuration illustrating the principles of the present invention.

With regard to FIG. 32 of the drawings, the bicycle includes the same basic front and rear wheels 302 and 304, seat or saddle 306, and handlebars 308 as in prior embodiments. However, the frame including the main vertical support 470, and the angular bracing members 472, 474, 476, and 478, are arranged to provide additional strength and support at the pivot point 480 for the pedal levers, including the front portion 482 and the rear portion 484. A resilient stop of 486 is firmly secured to the frame, and limits the downward movement of each of the pedal levers by engagement with the front member 482. Of course, an independently movable pedal lever, not visible in FIG. 32, is mounted to pivot about the same pivot point 480. In practice, as mentioned elsewhere in this application, the two pedal levers may be operated either synchronously or alternately; therefore, the other pedal lever may be oriented precisely behind that shown in the foreground in FIG. 32.

Mounted on the rearwardly extending portion 484 of the pedal lever is a slider 488 which is movable along the length of the member 484 to change the effective gear ratio of the bicycle. As in the case of earlier embodiments of the invention, the chain 324 extends over the sprocket 490, and the free end of the chain is secured to a takeup constant tension strip spring 326 mounted at point 328 on the bicycle frame. The construction of the hub of 490 and other portions of the bicycle not disclosed in detail herein, is as described in connection with earlier figures of the drawings.

Figure 33:
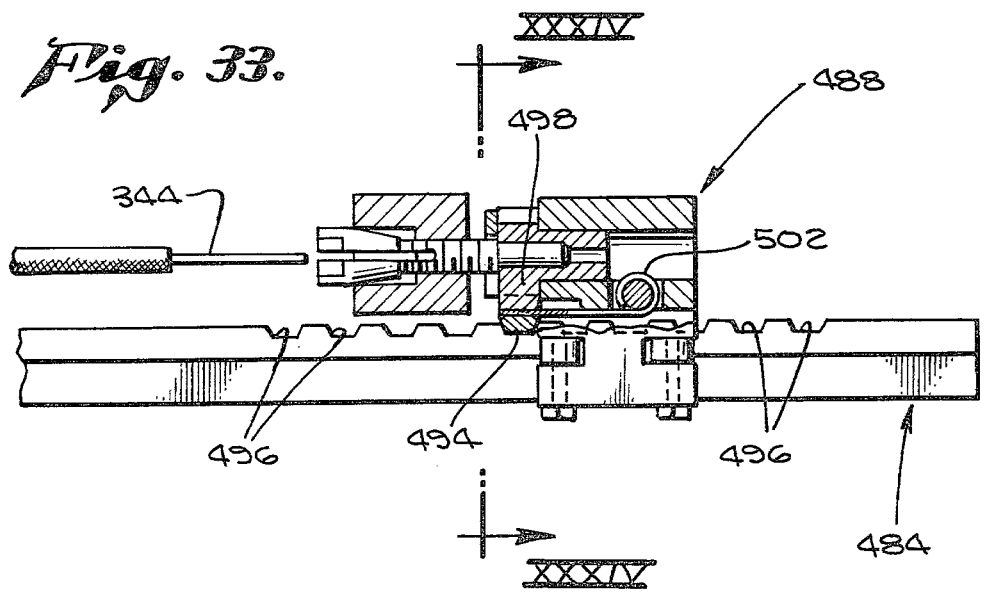
FIG. 33 is a top view of an alternative slider and rear pedal member configuration for changing the effective gear ratio.

FIG. 33 is a top view of the rearwardly extending portion 484 of the pedal level, together with a more detailed showing of the configuration of the slider 488 which is mounted on member 484. The slider 488 is provided with a detent 494 which may be locked into any of the recesses 496 in member 484 to hold the slider 488 in its proper position along the length of he member 484, thereby determining the lever arm through which force is applied to the chain 324 to drive the bike. In practice, as shown to advantage in FIG. 34, the detent 494 is selectively held in place in one of the recesses for 496 by the cam 498 which is rotated with the rotation of the control cable 344, in the manner described hereinabove for cam 342, in connection with FIGS. 22 and 23 of the drawings. When the cam 498 is rotated to its inactive position, the detent member 494 is pivoted to rotate about point 502 (see FIG. 33), and longitudinal pressure on the slider 488 will cause the detent 494 to pop out of the recesses 496 to permit changing of the effective gear ratio of the bike. When the slider 488 has been shifted to a new position, the cable 344 will be rotated so that the detent 494 is held into its new position in another recess 496 by the cam 498.

Figure 34:
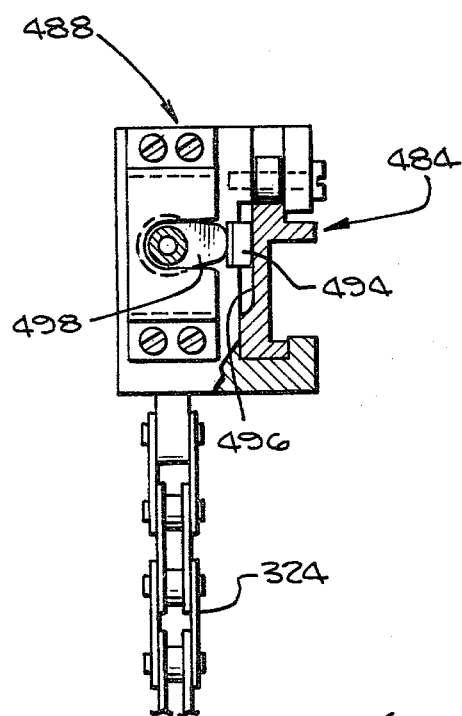
FIG. 34 is a partial cross-sectional view taken along lines XXXIV-XXXIV of FIG. 33.

It may be noted that the chain 324 may be secured to the slider 488 as shown in FIG. 34 so that plane of the chain is not aligned with the plane of movement of the portions 484 and 482 of the pedal lever. Using this arrangement, the spring 326 need not be aligned with the forwardly extending portion 482 of the pedal lever, and may be mounted at point 328 inside the path of travel of the front portion 482 of the pedal lever so that the pedal lever may swing past the constant tension spring mounting point 328.

Figure 35:
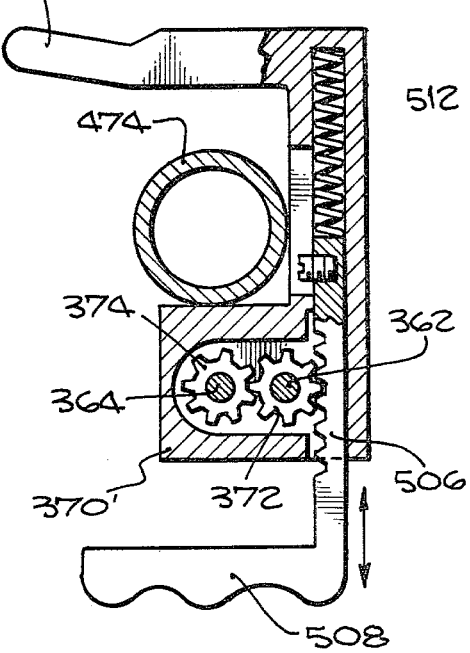
FIG. 35 is a partial cross-sectional view of the hand-operated mechanism for shifting the speed ratio of the bike of FIG. 32.

One arrangement for moving the two cables' longitudinally, and for rotating both of the two cables for the two pedal levers concurrently Was shown in FIGS. 24 and 25. Another arrangement which may be used interchangeably with that of FIGS. 24 and 25 is shown in FIG. 35. In FIG. 35 the two cables 362 and 364 are shown secured to gears 372 and 374 as in the case of FIGS. 24 and 25. However, instead of a handle such as that shown at 334 in FIGS. 24 and 25, the gear 372 and its associated cable 362 may be rotated by the rack 506 to which a handle 508 is provided for engagement by the fingers of the bike rider. The opposing fixed member 510 provides a good location for engagement by the thumb, when the rack 506 is moved vertically as the handle 508 is moved up. Incidentally, the spring 512 normally exerts a downward force on the rack 506, biasing the cables 362 and 364 in the proper orientation to lock the cams, including cam 498 in their locking positions. When the rack 506 is moved up, the detent 498 is released, and the position of the slider 488, and the corresponding slider on the other pedal lever, may be shifted by longitudinal movement of the cable members 362 and 364 in their housing 332. The foregoing mode of operation is, as noted above, substantially as described hereinabove for the mechanical arrangements of FIGS. 24 and 25; however, the location of the unit in FIG. 32 makes for easier operation by the bike rider.

Figure 36:
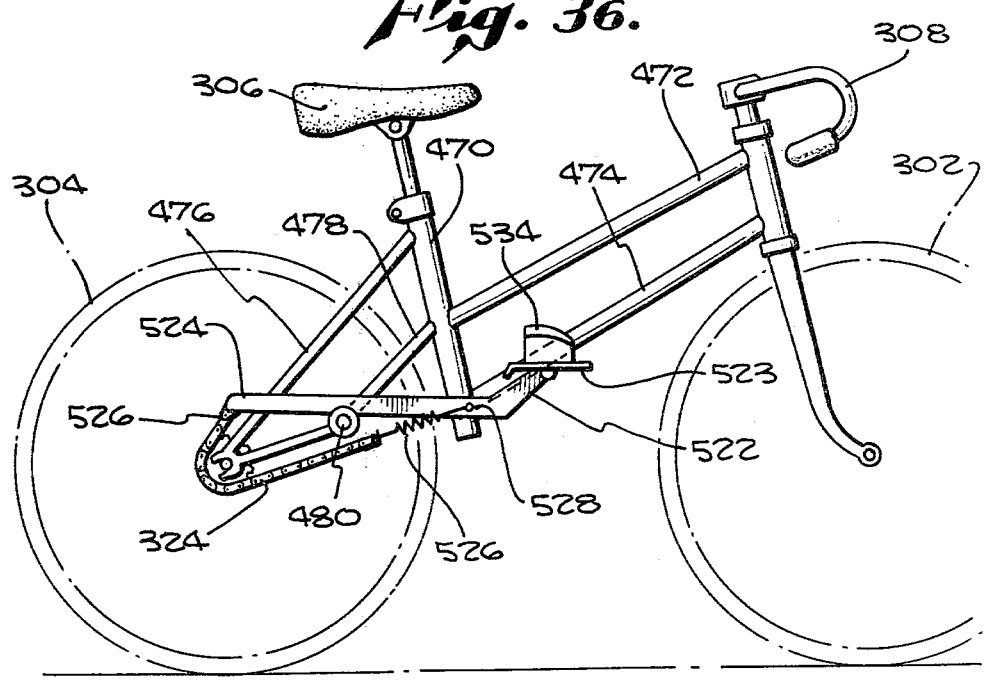
FIG. 36 is a side view of yet another embodiment of the invention.

Finally, FIG. 36 shows a single speed bike having a pedal lever including a forward portion 522 and a rearwardly extending portion 524. The bike is generally configured along the lines of that shown in FIG. 32, but the chain 324 is fixedly secured at point 526 to the rear end of Pedal lever portion 524, and through the short extension spring 526 to a point 528 on the forwardly extending portion 522 of the pedal lever. With the movement of the front portion of the pedal lever 522 compensating to some extent for the upward movement of the chain secured to the point 526 on the rearwardly extending portion 524 of the pedal lever, a simple short extension spring 526 with limited extensibility, is adequate to maintain appropriate tension on the chain.

In place of the heel clips shown on the pedal platforms in earlier figures of the present drawings, the pedal platform 532 may be provided with a clip 534 which extends over the instep of the rider, to both permit easy raising of the pedal by the rider, and also to permit free and easy disengagement of the foot from the pedal when it is desired to dismount, or the like.

It is again noted that the bent configuration of the forwardly extending portions 310 of the pedal lever provides significant advantages. More particularly, with the arrangement as shown in FIG. 20 and subsequent more detailed showings, the total travel of the pedals may be in the order of $18\frac{1}{2}$ inches, using a 12 inch radius between the pivot point 336, as shown in FIG. 20, and the point of attachment of the pedal assembly 318. Further, in the representative showing of FIG. 20, the angle is nearly 90 degrees, with the starting point being in the order of 37 degrees above the horizontal and the final position being in the order of 50 degrees below the horizontal. It is also noted that this relatively long stroke, and its greater extent below the horizontal as compared with a stroke having equal portions above and below the horizontal, conforms more closely to the natural force producing movement of a human legs, and in this connection follows the movement of the leg in walking or running, and is therefore more efficient than a path which has equal arcuate portions above and below the horizontal. It is also noted that, with a reciprocating movement, the path from the top to the bottom of the force stroke may be somewhat longer than in the case of conventional bikes in which a circular motion of the pedal is required.

The independent articulation of the two pedal lever assemblies is again emphasized. This permits great flexibility and freedom of movement in supplying power to the bike. For example, the two pedal levers may be moved together; a single pedal only may be operated; in turning a corner the inner pedal lever may be operated with short strokes while the outer lever is operated through a full stroke; persons with reduced mobility of one leg can take full strokes with one leg, and partial stroke with the other; etc. etc. Such freedom of operation not only facilitates high speed competitive operation of the bicycle, but also makes pleasure riding much more enjoyable. As a collateral advantage and benefit, the number of parts in the cycle may be reduced, and the cost of the cycle reduced.

In conclusion, it is to be understood that the mechanical arrangements as described hereinabove are illustrative of the principles of the invention. It is also noted that the various alternative mechanical arrangements shown and described in connection with the bike of FIG. 1 could be used with the bike of FIG. 20, and vice versa. Other alternative mechanical arrangements may be employed to implement the general principles as outlined herein. For specific example but not of limitation, instead of the angled configuration shown for the front portion of the pedal levers, they may be smoothly curved from the pivot point to the point of attachment of the pedal platforms. Also, the present invention is applicable to cycles generally, to tricyles as well as bicycles, and to fourwheeled pedal actuated cycles. All such alternatives are considered to be within the spirit and scope of the invention.

What is claimed is:

1. An efficient oscillating pedal type cycle comprising:
   a cycle having a frame, front and rear wheels, and a seat;
   a pair of pedal levers each having a front member and a rear member rigidly connected together, and having an intermediate pivot point substantially where said two members join;
   pedal means mounted near the front end of each of said front members of said pedal levers, said pedal means including means for engaging the feet for the rapid restoring of the pedals to their upper positions following each power stroke,
   chain means having one end coupled to the rear member of each of said pedal levers at a driving point to drive the rear wheel of said cycle;
   means connected to the other end of said chain means for maintaining said chain means under tension with a force equal to or less than 5 pounds;
   the angle including said pivot point of said pedal levers as an apex and extending from said driving point on the rear member to the mounting point for said pedal means on the front member, being an oblique angle, directed downward and to the rear when said pedal levers are in an intermediate position;
   means for mounting each said pedal lever on said frame with said pivot point located generally under said seat;
   means for providing oscillating motion for said pedal means in a circular arc having a radius between 10 and 16 inches; and
   means for providing a range of movement for said rearwardly extending portion of said pedal lever to a point near and above the hub of said rear wheel at its most rearward point of oscillation, and to a point approaching the vertical in its most forward point of oscillation but not into the zone in front of the seat where the rider's legs or ankles could be contacted.

2. An efficient oscillating pedal type cycle as defined in claim 1 wherein said front member is bent up intermediate said pivot point and said pedal mounting point.

3. An oscillating pedal type cycle as defined in claim 2, wherein each spring means is mounted between the axis of said rear wheel and the lower end of the path of said pedal means, whereby the bent configuration of said pedal lever permits a longer pedal stroke without interference with said spring means.

4. An oscillating pedal type cycle as defined in claim 1 further comprising:
   means for changing the speed ratio of said cycle by changing the effective connecting point of said chain means along the length of said rearwardly extending members of said pedal levers, said speed changing means including a slider mounted on each of said rearwardly extending members of said pedal levers, and means for securely locking said sliders in place on said pedal levers; and
   cable means connected to each of said sliders for remotely unlocking said sliders and shifting their positions to change speed ratios.

5. An oscillating pedal type cycle as defined in claim 4 wherein said rearwardly extending members of said pedal levers are of substantially T-shaped cross-section.

6. An oscillating pedal type cycle as defined in claim 4 wherein means are provided for moving said cable means both longitudinally and rotationally, for shifting and locking said sliders, respectively.

7. An efficient oscillating pedal type cycle as defined in claim 1 wherein said front pedal member is located principally above the line between said pivot point and said pedal mounting point.

8. An efficient oscillating pedal type cycle as defined in claim 1 wherein said front pedal member is located principally below the line between said pivot point and said pedal mounting point.

9. An efficient oscillating pedal type cycle as defined in claim 1 including means for mounting said pedal levers for operation wholly independent of one-another.

10. An efficient oscillating pedal type cycle as defined in claim 1 further comprising means secured to each of said pedal means for extending over the toe or instep of a rider for rapidly raising the front member of said pedal levers to the upper position.

11. An efficient oscillating pedal type cyle comprising:
   a cycle having a frame, front and rear wheels, and a seat, said frame being substantially limited in extent to the space above the line interconnecting the centers of said front and rear wheels;
   a pair of pedal levers each having a front member and a rear member rigidly connected together, and having an intermediate pivot point substantially where said two members join;
   pedal means mounted near the front end of each of said front members of said pedal levers;
   chain means having one end coupled to the rear member of each of said pedal levers at a driving point to drive the rear wheel of said cycle;
   means including a spring having a meximum force of less than five pounds connected to the other end of each of said chain means for maintaining said chain means under tension;
   means for mounting each said pedal lever on said frame with said pivot point located generally below said seat;
   means for providing a range of movement for said rearwardly extending portion of each said pedal lever to a point near and above the hub of said rear wheel at its most rearward point of oscillation, and to a point approaching the vertical in its most forward point of oscillation but not into the zone in front of the seat where the rider's legs or ankles could be contacted;
   movable slider means for changing the speed ratio of said cycle by changing the effective connection point of each of said chain means along the length of each of said rearwardly extending members of said pedal levers;
   means for securely, firmly positively locking said movable speed ratio changing means in place onto said pedal levers to preclude rattling and vibration in applying power to said bicycle, and for unlocking said slider means;
   cable means connected to each of said slider means for remotely actuating said locking and unlocking means to the unlocked position and for shifting the positions of said slider means to change speed ratios;
   said cycle including means for operating said pedal levers independently of one another, whereby said pedals may be operated with different length strokes, or together, or alternately with equal length strokes, and with the pedal raising motion at a different speed than the powerstroke;

said pedal means including means for engaging the feet of the rider for rapid raising of said pedals, and also including means for permitting quick disengagement of the feet from said pedals for safety purposes.

12. A cycle as defined in claim 11 including means for rotating each of said cable means to unlock said sliders, and for moving each of said cable means along its length to change speed ratios.

13. A cycle as defined in claim 11 wherein said spring is connected between the end of each chain and the front member of each of the associated pedal levers.

14. A cycle as defined in claim 11 wherein quick release means are provided at each end of said chain for disconnecting said chain from said cycle.

15. A versatile, efficient, high speed, oscillating pedal type cycle comprising:

a cycle having a frame, front and rear wheels, and a seat, said frame being substantially limited in extent to the space above the line interconnecting the centers of said front and rear wheels;

means including a pair of pedal levers each having a predetermined range of movement for applying power to drive said cycle;

pedal means secured to the front of said pedal levers for engagement by the feet for driving said bicycle, wherein the improvement is characterized in that:

said cycle includes means for mounting said pedal levers for operation wholly independently of one-another, whereby said pedals may be operated with different length strokes, or together, or alternatively, with equal length strokes, and with the pedal raising motion at a different and more rapid or slower speed than the power stroke; and also includes means for the high speed restoring of the front of said pedal levers to their upper portions, including means associated with each pedal means for engaging the foot or shoe of the rider, said restoring means having minimal opposing force less than 5 pounds, to pedal actuation during the power stroke.

16. A versatile oscillating pedal type cycle as defined in claim 15 wherein:

each of said pedal levers has a front member and a rear member rigidly connected together, and an intermediate pivot point substantially where said two members join; and further comprising:

chain means having one end coupled to the rear member of each of said pedal levers at a driving point to drive the rear wheel of said cycle; and means connected to the other end of said chain means for maintaining said chain means under tension, said tensioning means having a force of less than about 5 pounds.

17. A versatile oscillating pedal type cycle as defined in claim 15 further comprising means for pivotally mounting each said pedal lever on said frame with the pivot point located generally under said seat.

18. A versatile oscillating pedal type cycle as defined in claim 15 wherein each said pedal lever has its front member bent between its pivot point and the mounting point for said pedal means, to permit a longer, more efficient pedal stroke.

19. An oscillating pedal type cycle as defined in claim 16 further comprising:

means for changing the speed ratio of said cycle by changing the effective driving point of said chain means along the length of said rearwardly extending members of said pedal levers, said speed changing means including a slider mounted on each of said rearwardly extending members of said pedal levers, and means for securely and positively locking said sliders in place on said pedal levers; and cable means connected to each of said sliders for remotely unlocking said sliders and shifting their positions to change speed ratios.

20. An oscillating pedal type cycle as defined in claim 19 wherein means are provided for moving said cable means both longitudinally and rotationally, for shifting and locking said sliders.

21. A versatile oscillating pedal type cycle as defined in claim 15 further comprising means secured to each of said pedal means for engaging the upper surface of the toe or instep of the shoe of a rider to raise the front member of said pedal levers to the upper position, said engaging means being open to the side for ease in releasing the feet from the pedal.

22. An oscillating pedal type cycle as defined in claim 16 further comprising:

means for changing the speed ratio of said cycle by changing the effective connected point of said chain means along the length of said rearwardly extending members of said pedal levers, said speed changing means including a slider mounted on each of said rearwardly extending members of said pedal levers, and means for securely and positively locking said sliders firmly in place on said pedal levers; and cable means connected to each of said sliders for remotely unlocking said sliders and shifting their positions to change speed ratios.

23. A cycle as defined in claim 22 including means for rotating each of said cable means to unlock said sliders, and for moving each of said cable means along its length to change speed ratios.

24. A cycle as defined in claim 16 wherein said means for maintaining said chain means under tension is a spring connected between the end of each chain and the front member of each of the associated pedal levers.

25. A cycle as defined in claim 16 wherein quick release means are provided at each end of said chain for disconnecting said chain from said cycle.

26. A versatile oscillating pedal type cycle as defined in claim 16 further comprising:

means associated with each pedal means for engaging the foot or shoe of the rider, said restoring means including means for permitting unconstrained outward lateral movement of the feet, whereby the safety of the cycle rider is enhanced.

27. A cycle as defined in claim 16 wherein said tensioning means is a constant tension spring.

28. A versatile oscillating pedal type cycle comprising:

a cycle having a frame, front and rear wheels, and a seat;

means including a pair of pedal levers each having a predetermined range of movement for applying power to drive said cycle;

said cycle including means for mounting said pedal levers for operation wholly independent of one-another, whereby said pedals may be operated with different length strokes, or together, or alternatively with equal length strokes, and with the pedal raising motion at a different speed than the power stroke;

pedal means secured to the front of said pedal levers for engagement by the feet for driving said bicycle; and means for the high speed restoring of the front of said pedal levers to their upper positions, including means associated with each pedal means for engaging the foot or shoe of the rider, said restoring means including means for permitting unconstrained outward lateral movement of the feet, whereby the safety of the cycle rider is enhanced; said restoring means having an opposing force applied to said pedal levers of less than five pounds during the power stroke.

29. A versatile oscillating pedal type cycle comprising;

a cycle having a frame, front and rear wheels, and a seat;

means including a pair of pedal levers each having a predetermined range of movement for applying power to drive said cycle;

said cycle including means for mounting said pedal levers for operation wholly independent of one-another, whereby said pedals may be operated with different length strokes, or together, or alternatively with equal length strokes, and with the pedal raising motion at a different speed than the power stroke;

pedal means secured to the front of said pedal levers for engagement by the feet for driving said bicycle;

means for the restoring of the front of said pedal levers to their upper positions at speeds higher than the speed of the power stroke and with full capability of introducing pauses at the beginning and end of the restoring stroke, including means associated with each pedal means for engaging the foot or shoe of the rider, said restoring means having an opposing force of less than 5 pounds applied to each of said pedal levers during the power stroke.

30. A versatile oscillating pedal type cycle comprising:

a cycle having a frame, front and rear wheels, and a seat;

means including a pair of pedal levers each having a predetermined range of movement for applying power to drive said cycle;

said cycle including means for mounting said pedal levers for operation wholly independent of one-another, whereby said pedals may be operated with different length strokes, or together, or alternatively, with equal length strokes, and with the pedal raising motion at a different speed than the power stroke;

pedal means secured to the front of said pedal levers for engagement by the feet for driving said bicycle; and means for the high speed restoring of the front of said pedal levers to their upper positions, including means associated with each pedal means for engaging the foot or shoe of the rider, said restoring means having minimal opposing force less than 5 pounds, to the pedal lever during the power stroke.

31. A high speed, high efficiency, bicycle comprising:

a bicycle having a frame, front and rear wheels, and a seat;

a pair of pedal levers each having a front member and a rear member rigidly connected together;

means for pivotally mounting said pedal lever on said frame at a point generally below said seat;

means for mounting said pedal levers for operation independently of one another;

individual pedal means for engaging the rider's foot, pivotally mounted toward the front of said pedal levers;

means mounted on said pedal means for engaging the foot of the rider to provide the principal force for high speed raising of the front of said pedal lever to the upper position following each power stroke;

tension drive means having a first portion coupling the rear member of each of said pedal levers to drive the rear wheel of said bicycle, said tension drive means being interlockingly coupled to drive the hub of said rear wheel, and having a second portion extending beyond said hub; and spring means for applying a force less than five pounds to maintain said second portion of said tension drive means extended.

32. A high speed, high efficiency, full size bicycle comprising:

a bicycle having a frame, front and rear wheels each at least approaching 27 inches in diameter, and a seat;

a pair of pedal levers each having a front member and a rear member rigidly connected together;

means for pivotally mounting said pedal lever on said frame at a point generally below said seat;

means for mounting said pedal levers for operation independently of one another;

individual pedal means for engaging the rider's foot, pivotally mounted toward the front of said pedal levers;

means mounted on said pedal means for engaging the foot of the rider to provide the principal force for high speed raising of the front of said pedal lever to the upper position following each power stroke;

tension drive means having a first portion coupling the rear member of each of said pedal levers to drive the rear wheel of said bicycle, said tension drive means being interlockingly coupled to drive the hub of said rear wheel, and having a second portion extending beyond said hub;

spring means for applying a force less than five pounds to maintain said second portion of said tension drive means extended;

said coupling means for driving the rear wheel including two roller clutch means having virtually no back-play for unidirectionally applying force derived from said respective pedal levers to said rear wheel; and the angle including said pivot point of said pedal levers as an apex and extending from the driving point on the rear member to the mounting point for said pedal means on the front member, being an oblique angle, directed downward and to the rear when said pedal levers are in an intermediate position.

* * * * *